United States Patent
Dobell et al.

(10) Patent No.: US 10,794,690 B2
(45) Date of Patent: Oct. 6, 2020

(54) APPARATUS FOR LASER PROFILING INSPECTION

(71) Applicant: INUKTUN SERVICES LTD., Nanaimo (CA)

(72) Inventors: Colin Dobell, Ladysmith (CA); Jefferson S. G. Stanway, Nanaimo (CA); Abbasali Dehghan Tezerjani, Nanaimo (CA); Gabriel Neaga, Nanaimo (CA)

(73) Assignee: INUKTUN Services Ltd., Nanaimo (CA)

(*) Notice: Subject to any disclaimer, the term of this patent is extended or adjusted under 35 U.S.C. 154(b) by 106 days.

(21) Appl. No.: 16/301,568

(22) PCT Filed: May 10, 2017

(86) PCT No.: PCT/CA2017/050559
§ 371 (c)(1),
(2) Date: Nov. 14, 2018

(87) PCT Pub. No.: WO2017/197501
PCT Pub. Date: Nov. 23, 2017

(65) Prior Publication Data
US 2019/0145759 A1 May 16, 2019

(30) Foreign Application Priority Data
May 16, 2016 (CA) .................... 2930037

(51) Int. Cl.
*G01B 11/25* (2006.01)
*G01B 11/245* (2006.01)

(52) U.S. Cl.
CPC ........ *G01B 11/2518* (2013.01); *G01B 11/245* (2013.01); *G01B 11/25* (2013.01)

(58) Field of Classification Search
CPC ....... G01B 11/12; G01B 11/245; G01B 11/25; G01B 11/2513; G01B 11/2518
See application file for complete search history.

(56) References Cited

U.S. PATENT DOCUMENTS 5,895,927 A * 4/1999 Brown ................ G01B 11/12
250/559.19
6,815,701 B2 * 11/2004 Schlenkert ........... G01B 11/026
250/559.07

(Continued)

FOREIGN PATENT DOCUMENTS

| CA | 2 846 359 A1 | 9/2014 | |
| JP | 2013-036947 A | 2/2013 | |
| WO | WO-2014125690 A1 * | 8/2014 | ........ G01N 21/954 |

OTHER PUBLICATIONS

International Search Report Corresponding to PCT/CA2017/050559 dated Aug. 21, 2017.

(Continued)

*Primary Examiner* — Michael A Lyons
(74) *Attorney, Agent, or Firm* — Davis & Bujold PLLC; Michael J. Bujold

(57) ABSTRACT

An apparatus for laser profiling inspection includes a camera housing having a longitudinal axis and a substantially hemispherical viewing window positioned transversely relative to the longitudinal axis. A camera with a fisheye lens is positioned within the camera housing to capture images through the viewing window. A laser mounting is mounted to the viewing window with the laser mounting extending outwardly from the viewing window along the longitudinal axis of the housing. A laser is positioned at a remote end of the laser mounting. The laser projects a laser beam toward the camera. A mirror is supported by the laser mounting between the laser and the camera. The mirror is configured (Continued)

to reflect outwardly a laser beam from the laser to form a laser ring encircling the laser mounting.

**13 Claims, 6 Drawing Sheets
(2 of 6 Drawing Sheet(s) Filed in Color)**

(56) References Cited

U.S. PATENT DOCUMENTS

| | | | |
|---|---|---|---|
| 8,035,823 B2 | 10/2011 | Keightley et al. | |
| 2009/0237677 A1* | 9/2009 | Aoki | G01B 11/12 356/602 |
| 2010/0098398 A1* | 4/2010 | Dobell | G03B 17/08 396/144 |
| 2014/0211212 A1* | 7/2014 | Yokota | G01B 11/2518 356/601 |
| 2015/0015873 A1* | 1/2015 | Baba | G01B 11/272 356/153 |
| 2018/0156738 A1* | 6/2018 | Wagner | G01B 11/2527 |

OTHER PUBLICATIONS

Written Opinion Corresponding to PCT/CA2017/050559 dated Aug. 21, 2017.
International Preliminary Report on Patentability Corresponding to PCT/CA2017/050559 completed Aug. 27, 2018.

* cited by examiner

PRIOR ART

APPARATUS FOR LASER PROFILING INSPECTION

FIELD

There is described an apparatus that is used for laser profiling inspection. The most common application for laser profiling inspection being for use in inspecting an interior surface of a pipe.

BACKGROUND

With laser profiling inspection a laser ring is projected onto an object being inspected, a camera is used to capture an image and computer software is then used to calculate dimensions. An example of a common application for laser profiling inspection is for use in inspecting an interior surface of a pipe for wear and surface defects.

Examples of laser profiling inspections are described and illustrated at web sites www.rapidview.com/profiler.html and www.redzone.com/products/snap-on-lasers.

A problem with these inspections is that there are unavoidable blanks spots or voids in critical inspection areas, where mountings for the laser interfere with the camera view. Referring to FIG. 4 and FIG. 5, there is illustrated how these "blank spots" affect the resulting camera images.

SUMMARY

There is provided an apparatus for laser profiling inspection, the apparatus includes a camera housing having a longitudinal axis and a substantially hemispherical viewing window positioned transversely relative to the longitudinal axis. A camera with a fisheye lens is positioned within the camera housing to capture images through the viewing window. A laser mounting is mounted to the viewing window with the laser mounting extending outwardly from the viewing window along the longitudinal axis of the housing. At least one laser is mounted at a remote end of the laser mounting. The at least one laser projects a laser beam toward the camera. A mirror is supported by the laser mounting between the at least one laser and the camera. The mirror is configured to reflect outwardly a laser beam from the at least one laser to form a laser ring encircling the laser mounting.

It would not be accurate to state that the present invention eliminates the "blank spots" caused by the laser mounting. What the present invention does is move the "blank spot" to a position along the longitudinal axis extending outwardly from the camera housing. In this position, the "blank spot" is of no consequence for most laser profiling inspection applications.

The viewing window is substantially hemispherical or "domed" in order to void deflection of light off the window which would distort the laser image. This is also important in order to reduce calculation problems caused by light refraction when using the camera underwater.

There are various ways of configuring the mirror to create a laser ring encircling the laser mounting. There will hereinafter be illustrated and described two mirror configurations. A first mirror configuration is a rotating mirror having a reflective surface oriented at an angle to the laser beams, thereby forming a laser ring. The mirror is rotated by an electric motor. The second mirror configuration is a conical mirror. With the conical mirror, the laser beam may be passed through a ring projector to form multiple rings of light. As the conical mirror has a reflective surface oriented at an angle the multiple rings of light are reflected outwardly to form a laser ring.

In order to adjust to various laser profiling inspection applications, for example pipes having different inner diameters, it is preferred that the mirror is axially movable along the laser mounting toward the remote end and away from the remote end. This allows a distance of the mirror to the one or more lasers to be selectively adjusted, along with the properties of the resulting laser ring.

In order to allow for use underwater, submerged in other liquids or corrosive gaseous environments, it is preferred that the laser mounting be in the form of a tube that contains the mirror. The tube is sealed against the elements and is clear in a vicinity of the mirror to allow for outward projection of the laser ring, when a laser beam passing along the tube strikes the mirror.

In order to avoid loss of mirror adjustment capabilities with a sealed laser mounting, it is preferred that the mirror has a support with an inner core and an outer ring. The inner core is positioned within the tube with the mirror and the outer ring is positioned outside of the tube. The inner core and the outer ring are magnetically coupled, such that moving the outer ring axially along the outside of the tube toward the remote end or away from the remote end, results in a corresponding movement of the inner core and, consequently, the mirror.

An improved manner of configuring the apparatus for laser profiling inspection through a laser mounting "module" is also described. As is the use of modular spacers as a means of adjustment.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features will become more apparent from the following description in which reference is made to the appended drawings, the drawings are for the purpose of illustration only and are not intended to be in any way limiting, wherein.

DETAILED DESCRIPTION

Figure 1:
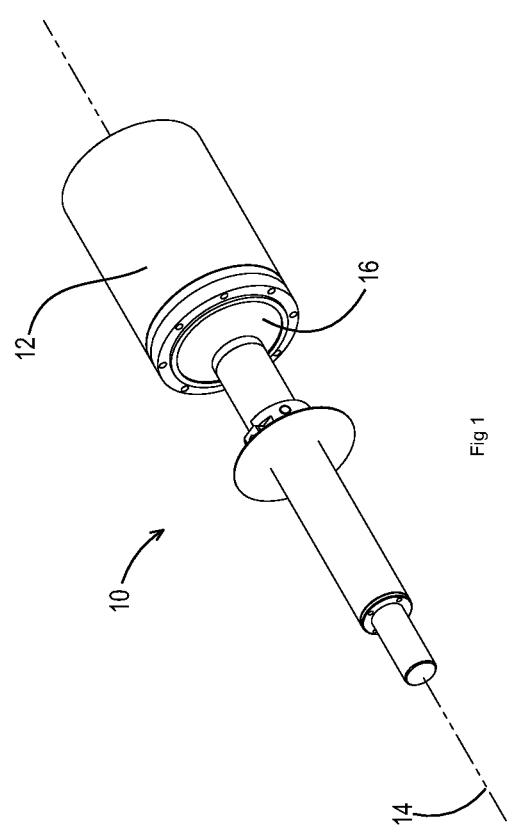
FIG. 1 is a perspective view of an apparatus for laser profiling inspection.

A first embodiment of apparatus for laser profiling inspection generally identified by reference numeral 10, will now be described with reference to FIG. 1 and FIG. 2. A second embodiment of apparatus for laser profiling inspection generally identified by reference numeral 100, will now be described with reference to FIG. 3. A third embodiment of apparatus for laser profiling inspection generally identified by reference numeral 200, will now be described with reference to FIG. 6.

Figure 2:
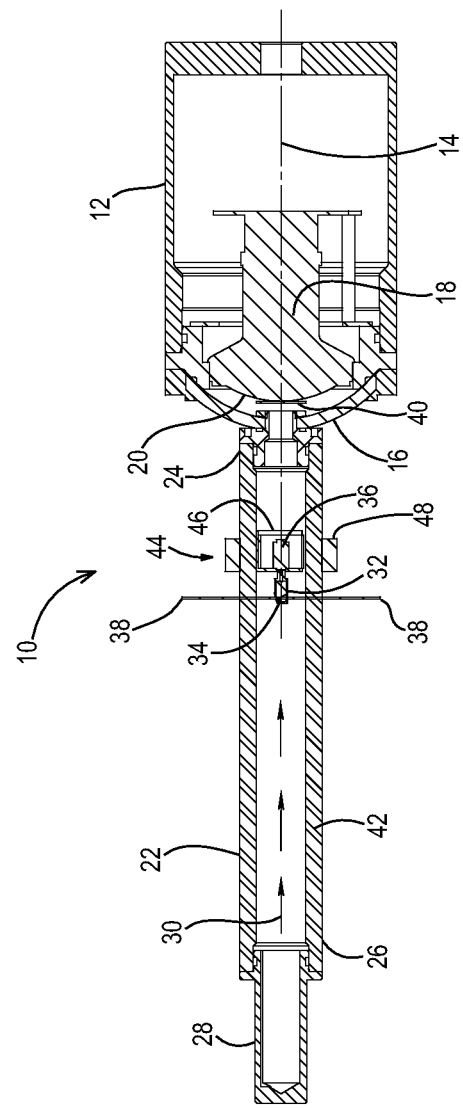
FIG. 2 is a side elevation view, in section, of the apparatus for laser profiling inspection illustrated in FIG. 1.

Structure and Relationship of Parts of First Embodiment 10:

Referring to FIG. 1 and FIG. 2, apparatus 10 includes a camera housing 12 having a longitudinal axis, shown in broken lines 14, and a viewing window 16 positioned transversely relative to longitudinal axis 14. Referring to FIG. 2, a camera 18 with a fisheye lens 20 is positioned within camera housing 12 to capture images through viewing window 16. A laser mounting 22 is provided having an attachment end 24 and a remote end 26. Attachment end 24 is mounted to viewing window 16 with laser mounting 22 extending outwardly from viewing window 16 along longitudinal axis 14. With apparatus 10, as illustrated, a single laser 28 is mounted at remote end 26 of laser mounting 22. It will be appreciated that more than one laser could be used. Laser 28 projects a laser beam 30, shown by arrows, toward camera 18. A mirror 32 is supported by laser mounting 22 between laser 28 and camera 18. Mirror 32 is a rotating mirror having a reflective surface 34 oriented at an angle to laser beam 30. Mirror 32 is rotated by an electric motor 36. As mirror 32 rotates, reflective surface 34 of mirror 34 reflects laser beam 30 from laser 28 outwardly to form a laser ring 38 which encircles laser mounting 22.

A "blank spot" with respect to the image recorded by camera 18 is caused by the positioning of laser mounting 22. This "blank spot" is positioned along longitudinal axis 14. A plate 40 positioned on longitudinal axis 14, covers fisheye lens 20 where laser mounting 22 is positioned. It is important to note that the "blank spot" represented by plate 40 positioned along longitudinal axis 14 is of no consequence for most laser profiling inspection applications.

In order to allow for use underwater, submerged in other liquids or corrosive gaseous environments, it is preferred that laser mounting 22 be in the form of a tube 42 that contains mirror 32. Tube 42 is sealed against the elements and is clear in a vicinity of mirror 32 to allow for outward projection of laser ring 38. Laser 28 positioned at remote end 26 of laser mounting 22 projects laser beam 30 down tube 42 to mirror 32.

In order to adjust to various laser profiling inspection applications, for example pipes having different inner diameters, mirror 32 is axially movable along laser mounting 22 toward remote end 26 and away from remote end 26. This allows a distance of mirror 32 to laser 28 to be selectively adjusted, along with the properties of resulting laser ring 38. In order to allow for adjustment of the positioning of mirror 32, with mirror sealed within tube 42, mirror 32 and electric motor 36 are supported by a support, generally indicated by reference numeral 44 that has an inner core 46 and an outer ring 48. Inner core 46 is positioned within tube 42. Outer ring 48 is positioned outside of tube 42. Inner core 46 and outer ring 48 are magnetically coupled, such that moving outer ring 48 axially along outside of tube 42 toward remote end 26 or away from remote end 26, results in a corresponding movement of inner core 46 and, consequently, mirror 32.

It is to be noted that viewing window 16 is substantially hemispherical or "domed", preferably of clear acrylic or glass. This configuration is selected in order to avoid deflection of light off viewing window 16 which would distort the laser image. This is preferred in order to reduce calculation problems caused by light refraction when using first embodiment 10 underwater.

Operation of First Embodiment 10:

Referring to FIG. 2, laser 28 projects laser beam 30 onto mirror 32. Mirror 32 is rotated by electric motor 36. As mirror 32 rotates, reflective surface 34 of mirror 34 reflects laser beam 30 from laser 28 outwardly to form a laser ring 38 which encircles laser mounting 22, as illustrated in FIG. 1, and projects onto the object being inspected, such as a pipe inside diameter (not shown). Laser ring 38 is visible on an image taken by camera 18. The image is fed into a computer running machine vision algorithms to automatically find and extract laser ring 38. When it is desired to adjust the positioning of laser ring 38, for example to suit a pipe having a differing interior diameter, outer ring 48 is moved axially along outside of tube 42 toward remote end 26 or away from remote end 26. Due to the magnetic coupling of outer ring 48 and inner core 46, this results in a corresponding movement of inner core 46 and, consequently, a repositioning of mirror 32.

The method of calculation is known to persons skilled in the art. By knowing a distance between camera 18 and mirror 32, a person skilled in the art can use triangulation to calculate a distance between camera 18 and a peripheral edge of laser ring 38.

In order to measure the pipe profile, we first need to calibrate the fish-eye camera. The calibration process calculates the mapping from the camera-laser head distance, and the pixel location on the image to the actual position of the point on the pipe:

$$\theta = f_\theta(d, u, v)$$

$$r = f_r(d, u, v)$$

In these equations, d is the distance from the laser to camera, and <u, v> is the pixel coordinate on the image. θ is the orientation of the point relative to the camera, and r is the radial distance of the point on the pipe wall to the camera normal.

After calibration is done, and the calibration functions are calculated, we do the following steps to extract the 3D profile of the pipe for any captured frame from the camera.

Step 1—extract the ring from the captured image.

Step 2—For each point on the ring image, calculate θ and r using the calibration functions.

convert θ and r to 3D point coordinate of the actual point on the pipe surface using following equation:

$$\begin{bmatrix} x \\ y \\ z \end{bmatrix} = \begin{bmatrix} r\cos(\theta) \\ r\sin(\theta) \\ d \end{bmatrix}$$

By rendering all these points, the 3D profile of the pipe at each frame is calculated.

Figure 3:
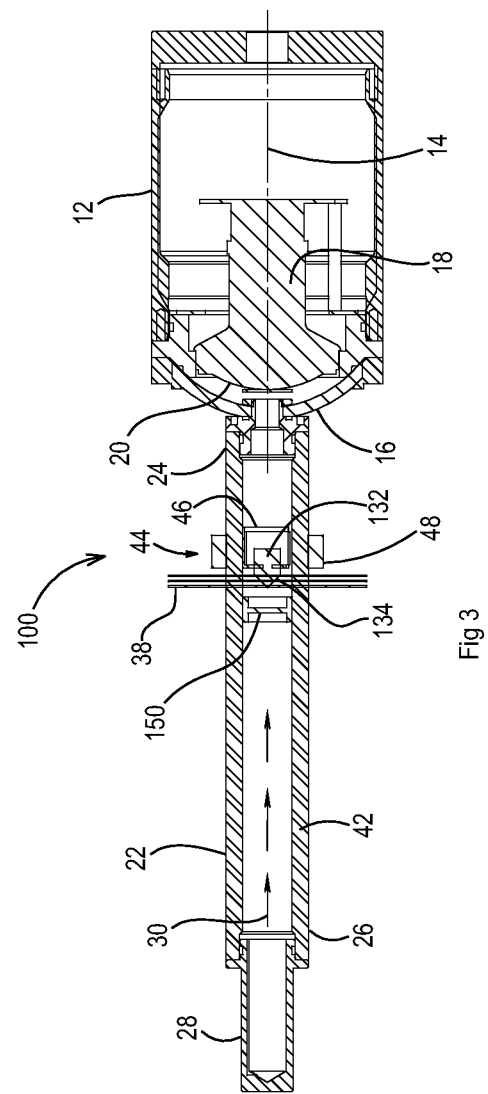
FIG. 3 is a side elevation view, in section, of a second embodiment of apparatus for laser profiling inspection.
Figure 4:
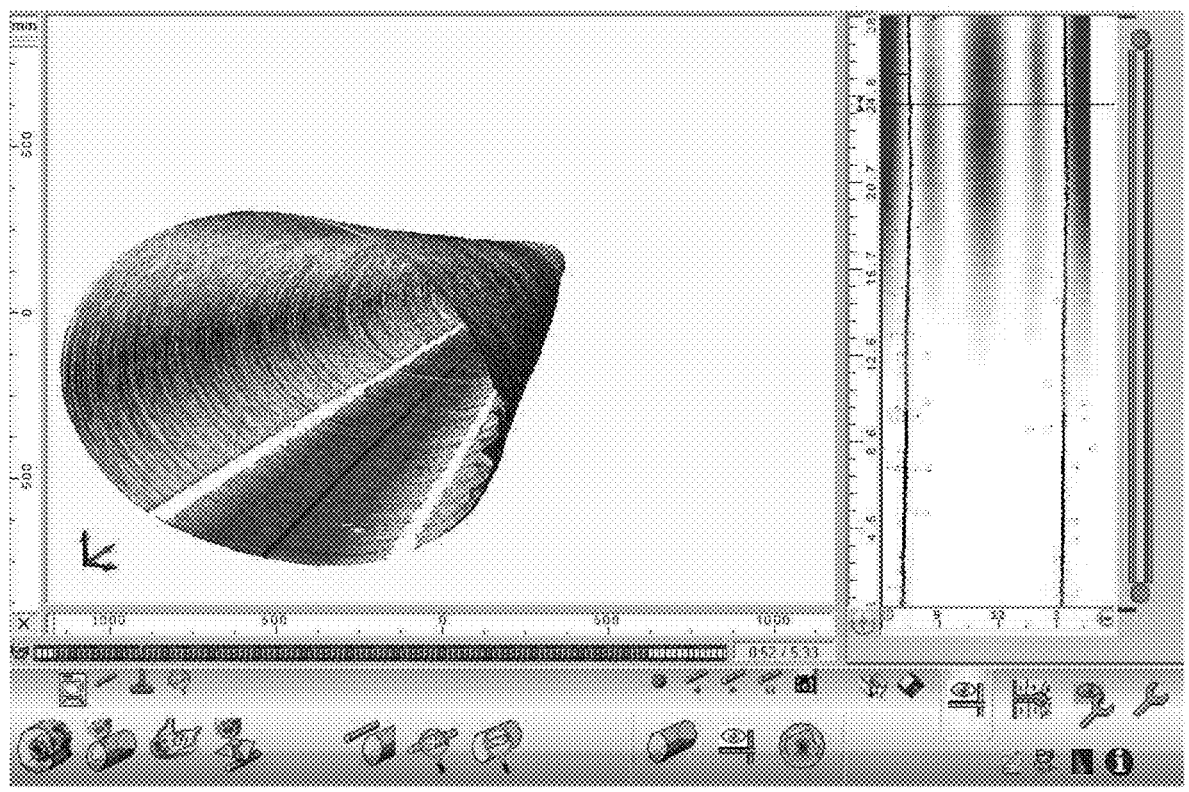
FIG. 4, labelled as PRIOR ART, is a first camera image.
Figure 5:
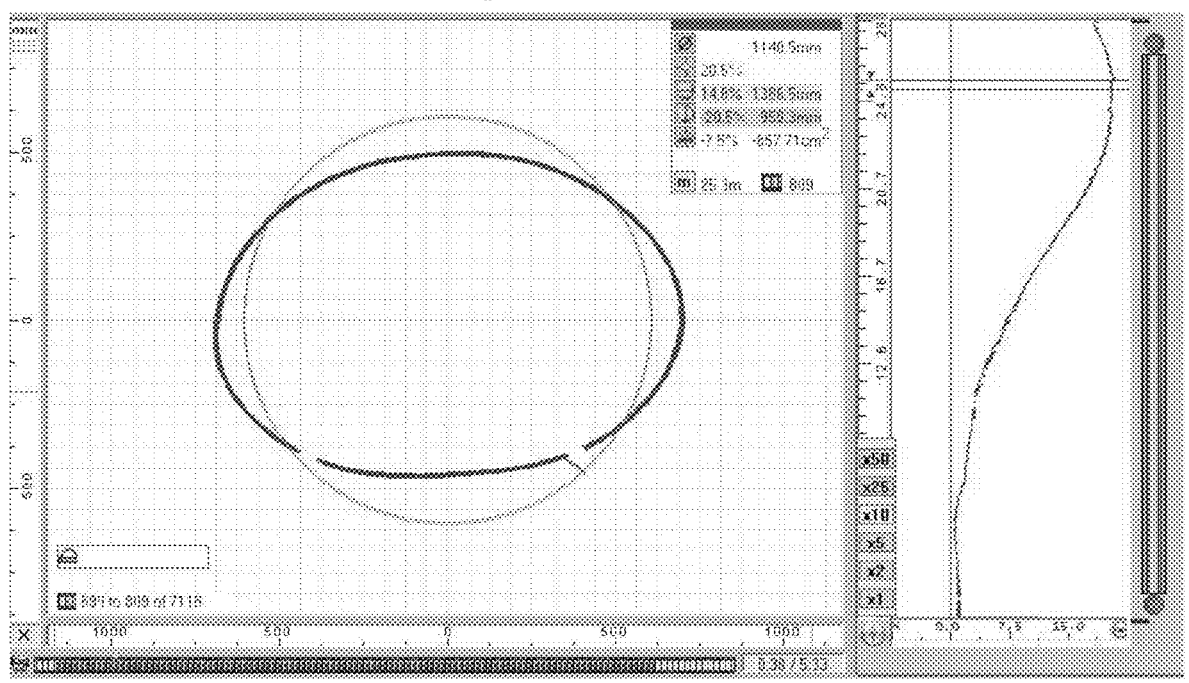
FIG. 5, labelled as PRIOR ART, is a second camera image.

Structure and Relationship of Parts of Second Embodiment 100:

Referring to FIG. 3, second embodiment 100 is similar in most respects to first embodiment 10. For that reason, identical reference numerals will be used to identify identical components. Second embodiment 100 also has a camera housing 12 having a longitudinal axis, shown in broken lines 14, and a substantially hemispherical viewing window 16 positioned transversely relative to longitudinal axis 14. A camera 18 with a fisheye lens 20 is positioned within camera housing 12 to capture images through viewing window 16. A laser mounting 22 is provided having an attachment end 24 and a remote end 26. Attachment end 24 is mounted to viewing window 16 with laser mounting 22 extending outwardly from viewing window 16 along longitudinal axis 14. A single laser 28 is mounted at remote end 26 of laser mounting 22. Laser 28 projects a laser beam 30, shown by arrows, toward camera 18.

In the above described first embodiment 10, mirror 32 was a rotating mirror rotated by motor 36. In this second embodiment 100, the mirror is a conical mirror 132 which is stationary and has angular reflective surfaces 134. In the above described first embodiment 10, mirror 32 was rotated by an electric motor 36. In this second embodiment 100, the same effect is created by passing lasers 28 through a ring projector 150 which casts multiple rings upon reflective surfaces 134 of conical mirror 132. Reflective surfaces 134 reflect the multiple rings outwardly to form the laser ring 38 encircling laser mounting 22.

As with the first embodiment 10, In order to allow for use underwater, submerged in other liquids or corrosive gaseous environments, it is preferred that for second embodiment 100 laser mounting 22 be in the form of a tube 42 that contains conical mirror 132. Tube 42 is sealed against the elements and is clear in a vicinity of mirror 132 to allow for outward projection of laser ring 38. Laser 28 positioned at remote end 26 of laser mounting 22 projects laser beam 30 down tube 42 through ring projector 150 to mirror 132.

As with first embodiment 10, in order to adjust to various laser profiling inspection applications, for example pipes having different inner diameters, conical mirror 132 is axially movable along laser mounting 22 toward ring projector 150 and away from ring projector 150. This allows a distance of conical mirror 132 to ring projector 150 to be selectively adjusted, along with the properties of resulting laser ring 38. In order to allow for adjustment of the positioning of conical mirror 132, with conical mirror 132 sealed within tube 42, conical mirror 132 is supported by a support, generally indicated by reference numeral 44 that has an inner core 46 and an outer ring 48. Inner core 46 is positioned within tube 42. Outer ring 48 is positioned outside of tube 42. Inner core 46 and outer ring 48 are magnetically coupled, such that moving outer ring 48 axially along outside of tube 42 toward ring projector 150 or away from ring projector 150, results in a corresponding movement of inner core 46 and, consequently, conical mirror 132.

As with first embodiment 10, second embodiment 100 has a viewing window 16 which is substantially hemispherical or "domed", preferably of clear acrylic or glass. This configuration is selected in order to avoid deflection of light off viewing window 16 which would distort the laser image. This is preferred in order to reduce calculation problems caused by light refraction when using first embodiment 10 underwater.

Operation of Second Embodiment 100:

Referring to FIG. 3, laser 28 passes a laser beam 30 through ring projector 150. As laser beam 30 passes through ring projector 150 it is transformed into multiple rings of light which strikes reflective surfaces 134 of conical mirror 132. Reflective surfaces 134 reflect the multiple rings of light outwardly to form the laser ring 38 encircling laser mounting 22. Laser ring 38 is visible on an image taken by camera 18. The image is fed into a computer running machine vision algorithms to automatically find and extract laser "ring" 38, as described with the first embodiment.

Figure 6:
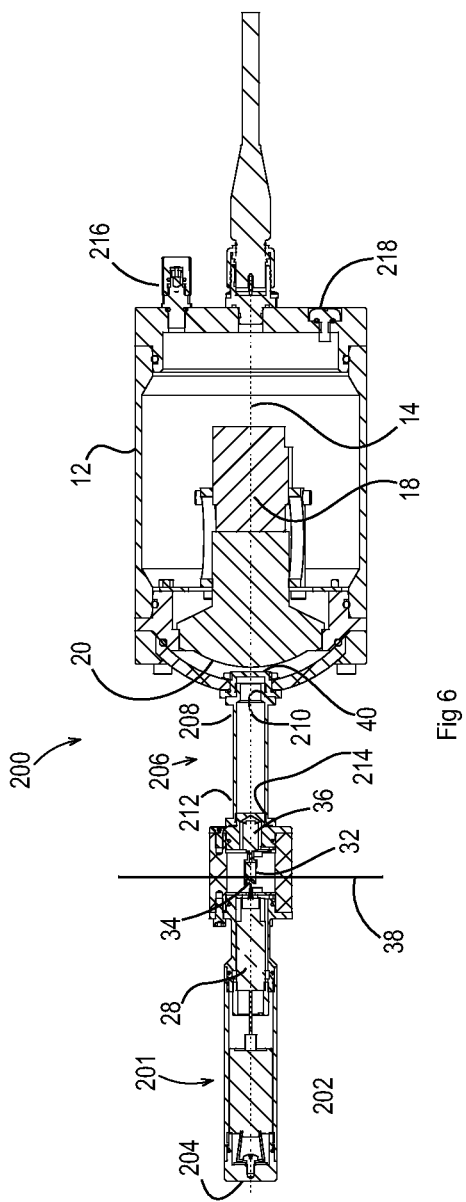
FIG. 6 is a side elevation view, in section, of a third embodiment of apparatus for laser profiling inspection.

Structure and Relationship of Parts of Third Embodiment 200:

Referring to FIG. 6, third embodiment 200 is similar in most respects to first embodiment 10. For that reason, identical reference numerals will be used to identify identical components. It is an embodiment which reflects what is believed to be the best mode of implementing the invention. The key differences between third embodiment 200 and first embodiment 10 are be summarized in the description which follows.

In third embodiment 200, laser 28, rotating mirror 32 and electric motor 36 which rotates rotating mirror 32 are all positioned in a laser mounting module 201 that is operated by a battery 202 physically located behind laser 28. This change eliminates wiring that previously was required between camera housing 12 and laser 28. In this configuration a sealed battery cap 204 acts as a switch to turn laser 28 and electric motor 36 on and off Without wiring, laser mounting module 201 becomes a replaceable module for quick setup or change out for repair or replacement. In addition to replacement when laser 28 or electric motor 36 is not functioning properly, replacement may simply involve changing to a laser with different properties, for example a laser that projects a different colour.

Instead of a laser mounting 22 with a continuous tube 42 used with first embodiment 10, third embodiment 200 uses a modular spacer 206. Modular spacer 206 has a first end 208 with threaded male connection 210 which is used to connect to camera housing 12 and a second end 212 with a threaded female connection 214 which his used to connect to laser mounting module 201. A number of modular spacers 206 of differing length are provided in 5 mm increments. This enables the distance between projected laser ring 38 and camera 18 to be varied in an exact and repeatable manner. Knowing the distance between projected laser ring 38 and camera 18 is a key parameter for correctly processing the image and accurately extracting pipe geometry. The distance that laser ring 38 projects outwardly is dictated by the distance between laser ring 38 and camera 18. When inspecting a pipe having a relatively smaller inner diameter, a relatively shorter modular spacer 206 should be used so that laser ring 38 when projected is appropriate for the relatively smaller inner diameter. Conversely, when inspecting a pipe having a relatively larger inner diameter, a relatively longer modular spacer 206 should be used so that laser ring 38 when projected is appropriate for the relatively larger inner diameter.

Efforts have also been made to provide more robust sealing for a better depth rating. A component of this is the provision in third embodiment 200 of a nitrogen purge valve 216 and a nitrogen purge port 218, so that the interior of camera housing 12 can be flooded with inert gas.

In terms of structure in common with first embodiment 10, third embodiment 200 has a camera housing 12 having a longitudinal axis, shown in broken lines 14, and a substantially hemispherical viewing window 16 positioned transversely relative to longitudinal axis 14. A camera 18 with a fisheye lens 20 is positioned within camera housing 12 to capture images through viewing window 16. In third embodiment 200, laser mounting 22 of first embodiment 10 has been replaced by laser mounting module 201, as described above. Laser 28 projects a laser beam 30 onto rotating mirror 32 rotated by electric motor 36. A "blank spot" with respect to the image recorded by camera 18 is caused by the positioning of modular spacer 206 and laser mounting module 201. This "blank spot" is positioned along longitudinal axis 14. A plate 40 positioned on longitudinal axis 14, covers fisheye lens 20 where modular spacer 206 and laser mounting module 201 are positioned. It is important to note that the "blank spot" represented by plate 40 positioned along longitudinal axis 14 is of no consequence for most laser profiling inspection applications.

Operation of Third Embodiment 200:

Referring to FIG. 6, a modular spacer 206 is selected which will provide a distance between projected laser ring 38 and camera 18 that will result in laser ring 38 reaching an inner diameter of a pipe being inspected. When inspecting a pipe having a relatively smaller inner diameter, a relatively shorter modular spacer 206 is used so that the outer limits of laser ring 38 is appropriate for the relatively smaller inner diameter. When inspecting a pipe having a relatively larger inner diameter, a relatively longer modular spacer 206 is so that the outer limits of laser ring 38 is appropriate for the relatively larger inner diameter. Third embodiment 200 is then assembled by connecting male connection 210 at first end 208 of modular spacer 206 to camera housing 12 and threaded female connection 2014 at second end 212 of modular spacer 206 to laser mounting module 201. Prior to use camera housing 12 is flooded with inert gas by connecting nitrogen purge valve 216 to a nitrogen source (not shown). The rush of incoming nitrogen will expel any air from camera housing 12 out of nitrogen purge port 218. Once all air has been expelled and only nitrogen is flowing from nitrogen purge port 218, nitrogen purge port 218 is closed and the nitrogen source disconnected from nitrogen purge valve 216.

Prior to insertion of third embodiment 200 into a pipe to be inspected, battery cap 204, which acts as a switch, is pressed in order to turn on laser 28 and electric motor 36. Electric motor 36 serves to rotate mirror 32. As mirror 32 rotates, reflective surface 34 of mirror 34 reflects laser beam 30 from laser 28 outwardly to form a laser ring 38 which encircles laser mounting module 201. Laser ring 38 projects onto the object being inspected, such as an inside diameter of a pipe (not shown). Laser ring 38 is visible on an image taken by camera 18. The image is fed into a computer running machine vision algorithms to automatically find and extract laser ring 38, as previously described in relation to first embodiment 10.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The illustrated embodiments have been set forth only as examples and should not be taken as limiting a purposive interpretation of the claims.

What is claimed is:

1. An apparatus for laser profiling inspection, comprising:
    a camera housing having a longitudinal axis and a substantially hemispherical viewing window positioned transversely relative to the longitudinal axis at one end of the camera housing and providing a view around the camera housing;
    a camera with a fisheye lens positioned within the camera housing to capture images through the viewing window;
    a laser mounting mounted to the viewing window, with the laser mounting extending outwardly from the viewing window along the longitudinal axis of the housing such that the laser mounting does not impinge upon the view around the camera housing provided by the viewing window;
    at least one laser mounted at a remote end of the laser mounting, remote from the camera, each of the one or more lasers projecting a laser beam toward the camera; and
    a mirror supported by the laser mounting between the at least one laser and the camera, the mirror being configured to reflect outwardly laser beams from the at least one laser to form a laser ring encircling the laser mounting, with the images of the laser ring being captured with the fisheye lens of the camera through the viewing window.

2. The apparatus of claim 1, wherein the mirror is a rotating mirror having a reflective surface oriented at an angle to the laser beams, thereby forming a laser ring.

3. The apparatus of claim 2, wherein the mirror is rotated by an electric motor.

4. The apparatus of claim 1, wherein the mirror is conical mirror having a reflective surface.

5. The apparatus of claim 4, wherein the laser beam is passed through a ring projector, and the ring projector casting multiple rings onto the conical mirror.

6. The apparatus of claim 1, wherein the mirror is axially movable along the laser mounting toward the remote end and away from the remote end so that a distance of the mirror to the at least one laser is selectively adjusted.

7. The apparatus of claim 1, wherein the laser mounting is a tube that contains the mirror, the tube is sealed and is clear in a vicinity of the mirror, and the at least one laser positioned at the remote end of the laser mounting projecting the laser beam down the tube toward the mirror.

8. The apparatus of claim 7, wherein the mirror has a support with an inner core and an outer ring, the inner core is positioned within the tube with the mirror, the outer ring is positioned outside of the tube, the inner core and the outer ring are magnetically coupled such that moving the outer ring axially along the outside of the tube toward the remote end or away from the remote end, results in a corresponding movement of the inner core and mirror so that a distance from the mirror to the at least one laser is selectively adjusted.

9. The apparatus of claim 1, wherein the laser mounting is a laser mounting module that contains the laser and the mirror, with the mirror positioned in front of and axially spaced from the laser.

10. The apparatus of claim 9, wherein the laser mounting module includes a battery which is physically located behind the laser, and the battery providing power to the laser.

11. The apparatus of claim 10, wherein the mirror is rotates and the laser mounting module includes an electric motor to rotate the mirror, and the battery providing power to the electric motor.

12. The apparatus of claim 9, wherein a modular spacer is used to establish a desired distance between the laser mounting module with the camera housing.

13. The apparatus of claim 1, wherein the camera housing has a nitrogen purge valve and a nitrogen purge port, for use in flooding the camera housing with nitrogen gas.

* * * * *